S. T. NELSON.
HOISTING ENGINE.
APPLICATION FILED JUNE 28, 1906.

No. 900,769.

Patented Oct. 13, 1908.
6 SHEETS—SHEET 3.

S. T. NELSON.
HOISTING ENGINE.
APPLICATION FILED JUNE 28, 1906.

900,769.

Patented Oct. 13, 1908.
6 SHEETS—SHEET 4.

S. T. NELSON.
HOISTING ENGINE.
APPLICATION FILED JUNE 28, 1906.

No. 900,769. Patented Oct. 13, 1908.
6 SHEETS—SHEET 5.

S. T. NELSON.
HOISTING ENGINE.
APPLICATION FILED JUNE 28, 1906.

900,769.

Patented Oct. 13, 1908.
6 SHEETS—SHEET 6.

UNITED STATES PATENT OFFICE.

SVEN T. NELSON, OF CHICAGO, ILLINOIS, ASSIGNOR TO SULLIVAN MACHINERY COMPANY, OF CHICAGO, ILLINOIS, A CORPORATION.

HOISTING-ENGINE.

No. 900,769.　　　　　Specification of Letters Patent.　　　　Patented Oct. 13, 1908.

Application filed June 28, 1906. Serial No. 323,824.

*To all whom it may concern:*

Be it known that I, SVEN T. NELSON, a citizen of the United States, and a resident of Chicago, county of Cook, and State of Illinois, have invented certain new and useful Improvements in Hoisting-Engines, of which the following is declared to be a full, clear, and exact description.

The invention relates to hoisting engines for operating the cages or "skips" in mines and the improvement seeks to provide safety mechanism for automatically cutting off or throttling the flow of motor fluid to the engine before the cage reaches the end of its upward travel in the mine shaft.

Further objects of the invention are to provide automatic mechanism for applying the brakes after the supply of motor fluid is cut off by the throttling mechanism and to provide means whereby the operation of the engine reverse gear and clutch mechanism will release or restore the automatic throttling mechanism to permit the further operation of the engine.

With these and other objects in view, the invention consists in the features of construction, combinations and arrangements of parts hereinafter set forth, illustrated in the accompanying drawings and more particularly pointed out in the appended claims.

The invention is more particularly applicable to a double drum hoist, in which two drums are mounted on the engine shaft, the cables thereon being wound in opposite directions so that the cars or cages may be hoisted "in balance". As usual, suitable clutch mechanism is provided for connecting either or both of the drums to the engine shaft. Means are provided in connection with each drum for automatically throttling the engine at a predetermined point as the car approaches the upper end of the mine shaft. Preferably also, means are provided in connection with each drum for automatically applying brake mechanism thereto subsequent to the operation of the throttling mechanism and just before the car reaches the upper end of its travel. Means are provided in connection with the clutch mechanism and reverse operating gear to release or restore the automatic throttling mechanism to permit the further operation of the engine. As usual with such double drum hoists, both drums are mounted on a common engine shaft and two engines are employed, one coupled to each end of the shaft.

In the drawings, Figs. 2 and 2ª are views in elevation on an enlarged scale of the operating parts of the automatic throttling and brake mechanisms, forming in effect one view with the parts on opposite sides of the central line of the hoist shown in separate figures. In these figures, certain parts are shown in section on the line 2—2 of Fig. 1. Fig. 90 13 is a view in elevation of the clutch with parts shown in section on the line 13—13 of Fig. 11.

Figures 3, 4, 5:
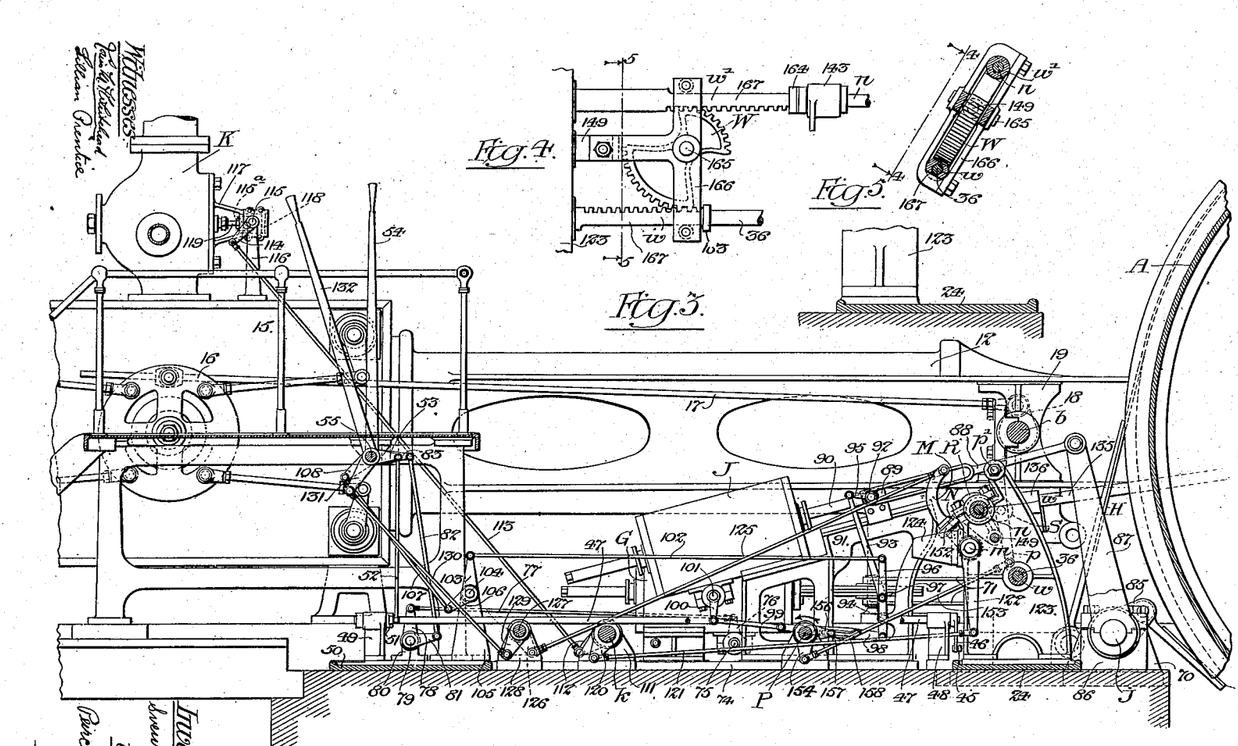
Fig. 3 is a view in side elevation with certain parts shown in section on the line 3—3 of Fig. 1.
Fig. 4 is an enlarged detail view of a portion of the operating mechanism shown in Fig. 2 and looking in the direction of the arrows on the line 4—4 of Fig. 5.
Fig. 5 is a detail section on the line 5—5 of Fig. 4.

In the form shown, the drums A, A' are mounted upon a common engine shaft *a*. As stated, the cables for the two cars or cages are wound in opposite directions about the drums, as is usual practice, so that the cars will be hoisted "in balance" when both drums are coupled to the shaft; that is to say, one of the cars will be raised as the other is lowered. The engine shaft is journaled in a suitable central bearing 10 and, at its ends, in bearings 11 at the forward ends of the two engine frames 12. At each end, shaft *a* is provided with a crank 13 coupled by a connecting rod 14 to the piston rod (not shown) of the adjacent engine. Each engine cylinder 15 (see Figs. 1 and 3) is provided with the ordinary Corliss valve gear driven from a wrist-plate 16. The wrist-plates are driven by connecting rods 17 coupled at their forward ends to cranks 18 on the ends of the valve operating shaft $b$. This shaft (see Figs. 1, 2 and $2^a$) extends from side to side of the engine in front of the drums A, A' and is journaled at either end in suitable bearings 19 in the engine frames 12 and, at intermediate points in bearings 20 and 21. Bearing 20 is arranged upon the upper end of the frame 22 and bearing 21 is arranged upon the upper end of an upright 23. Frame 22 and upright 23 rest upon a base plate 24 on the foundation of the engine.

Near the center of the machine, valve shaft $b$ is provided with a gear 25 that is driven from the gear 26 on the engine shaft through the medium of an intermediate idler 27. The idler 27 is journaled on a bracket 28 fixed to and projecting from the central bearing 10 of the engine shaft. Gears 25 and 26 are the same size so that the valve shaft rotates in the same direction and at the same speed as the engine shaft. Gear 25 is loose on the shaft but is provided with a pair of stops or lugs 29 (see Fig. $2^a$) arranged to engage an arm 30 that is fixed to the shaft so that the latter may be driven from the gear in one or the other direction. By shifting the shaft to move the arm 30 away from one of the stops or lugs 29 into engagement with the other stop or lug, the valve gear is properly positioned to reverse the engine. Any suitable means may be provided for shifting the valve shaft. In the form shown, the gear 25 is connected to the end of a sleeve 31 provided with a one-half portion 32 of a quick threaded screw. The other half portion 33 of the screw is fixed to the valve shaft $b$. A split nut 34 engages the screw sections 32 and 33 and by shifting the nut the valve shaft $b$ may be rotated to reverse the engine.

A small auxiliary engine B is preferably provided for shifting the reversing nut 34. This engine is mounted in the frame 22. The cross head 35 on the piston rod 36 of the reverse engine B is connected by links 37 to the lower ends of a pair of oscillating arms 38 that extend upwardly and are pivotally mounted between their ends upon a short stud shaft or bolt 39 extending through the frame 22. The upper ends of these arms engage pintles 40 on a split ring 41 which surrounds the nut 34 and engages a pair of flanges 42 thereon to shift the nut longitudinally, but permitting the rotation of the nut within the ring.

The stem 43 of the controlling valve of the reverse engine B is provided with a crank arm 44 (see Fig. 2) and this arm is connected by a link 45 to an arm 46 on the end of a shaft 47. This shaft is journaled at its forward end (see Fig. 3) in a bracket 48 on the bed-plate 24 and extends rearwardly therefrom beneath the engineer's platform C. At its rear end the shaft is journaled in a bracket 49 rising from the bed-plate 50 that is arranged on the foundation beneath the engineer's platform. The crank arm 51 on the rear end of the shaft is connected by a link 52 to an arm 53 of a hand lever 54. This hand lever is one of a series that project upwardly through the engineer's platform and are carried on a shaft 55 that is supported beneath the platform.

By the connections described, the valve of the reverse gear may be shifted by the engineer to operate the reverse engine and change the direction of movement of the engine and drums driven thereby.

Figures 11, 12:
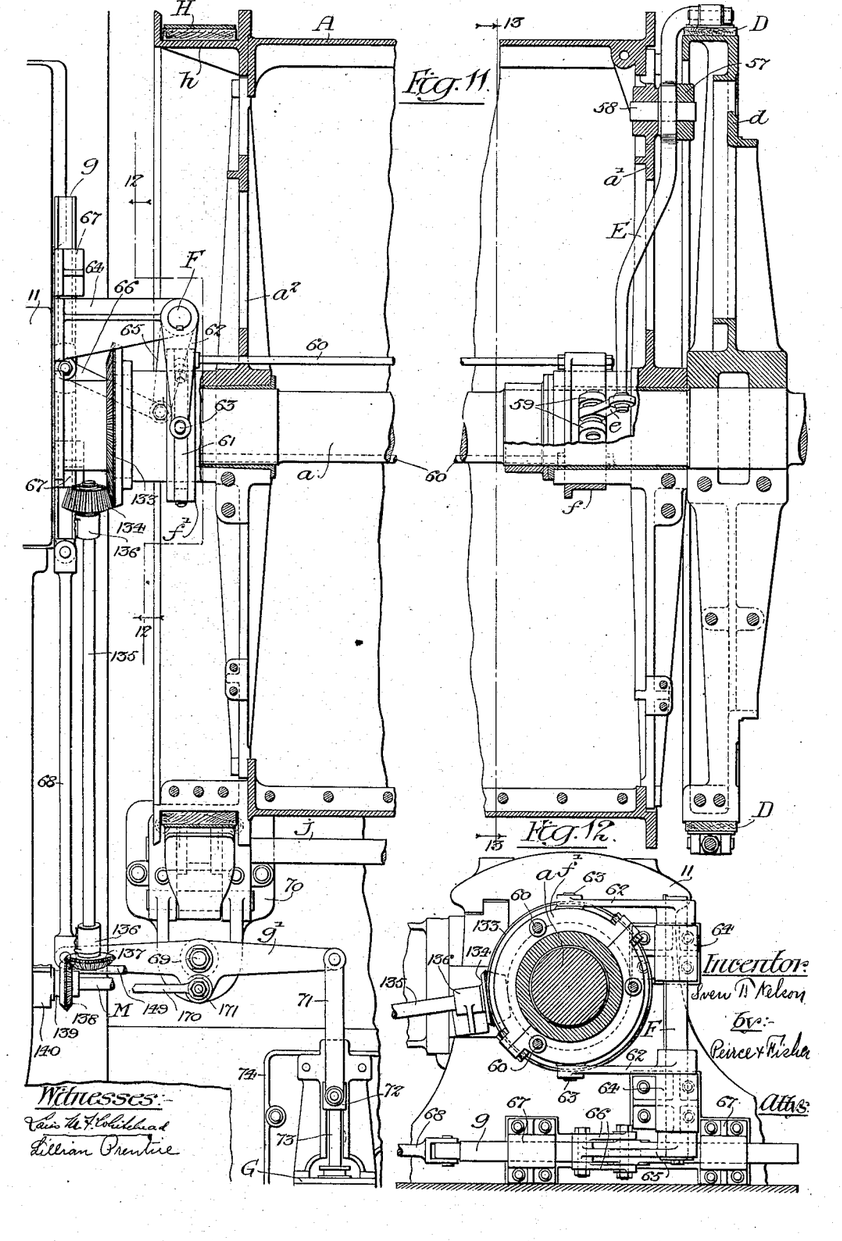
Fig. 11 is an enlarged plan view of the clutch operating mechanism with one of the drums shown in section.
Fig. 12 is a view in elevation of a portion of the clutch mechanism with parts shown in section on the line 12—12 of Fig. 11.
Figure 13:
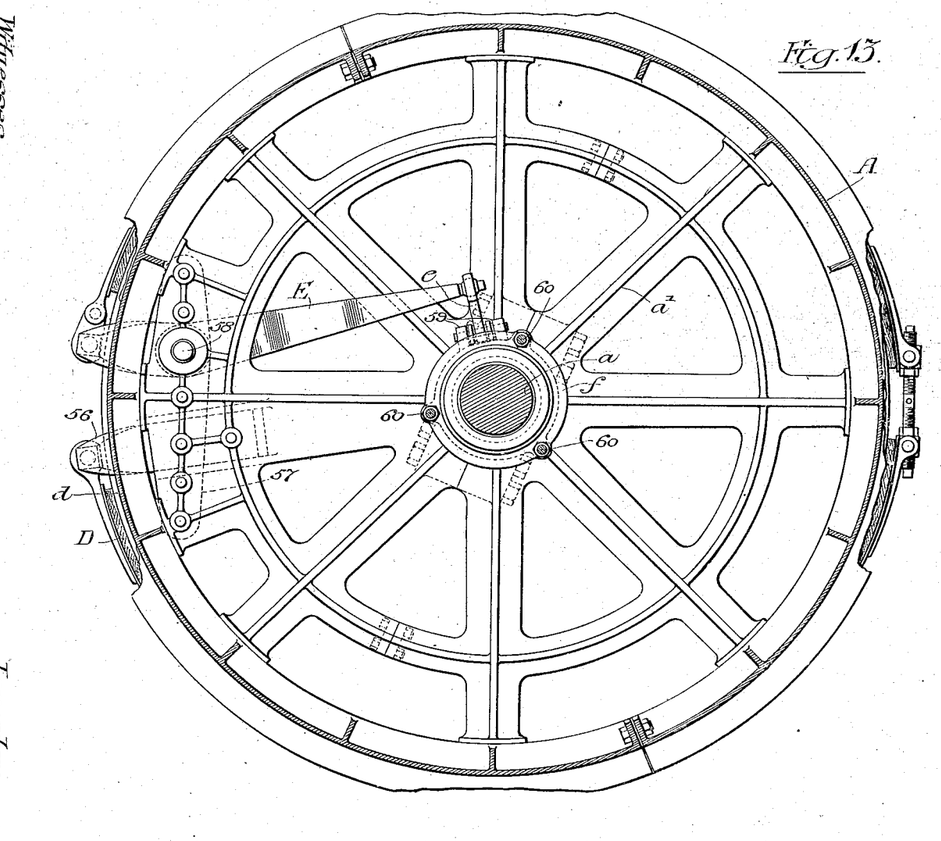

Each of the drums is arranged to be coupled to the engine shaft $a$ by suitable clutch mechanism shown in detail in Figs. 11, 12 and 13. The clutch mechanism of each drum comprises a clutch band D extending about and arranged to engage a clutch disk or member $d$ that is keyed to the shaft adjacent the inner end of the drum. One end of the band is secured to a lug 56 secured to the inner head $a'$ of the drum. This lug is arranged near the periphery of the drum head A' and between the head and a brace bar 57 that is securely bolted thereto. The lug 56 extends outwardly over the clutch disk or member $d$ and one end of the clutch band D is pivotally connected thereto. The other end of the clutch band is secured to the laterally bent upper end of a clutch operating lever E that extends inwardly between the inner clutch head $a'$ and the cross bar 57, and is carried on a stud shaft 58 extending between these parts. The inner end of the operating lever is bent inwardly and extends through an opening in the inner clutch head and is connected by a toggle link $e$ to a collar $f$. The toggle link $e$ is pivoted between a pair of lugs 59 on the collar $f$ and the latter is mounted upon the hub of the clutch head $a'$ and rotates therewith but is free to slide to force the inner end of the clutch operating lever E outwardly and thereby clamp the band D securely upon the clutch head or member $d$ to couple the drum to the shaft. Collar $f$ is shifted back and forth upon the hub of the drum head to connect and disconnect the drum from the engine shaft by three rods 60 (see Figs. 11 and 13) extending outwardly therefrom and fixed at their outer ends to a split collar $f'$ mounted upon the hub of the outer drum head $a^2$. This collar rotates with the drum but is free to slide longitudinally upon the hub of the outer drum head. A split ring 61 is arranged within an annular groove in the collar $f'$ and a pair of arms 62 on an upright shaft F engage pintles 63 upon opposite sides of the ring 61. The clutch operating shaft F is journaled in brackets 64 mounted on the outer bearing 11 of the engine shaft and projects inwardly therefrom. At its lower end the shaft is provided with an arm 65 connected by a link 66 to a slide $g$ which is arranged to reciprocate in horizontal direction through suitable bearings 67 upon the inner face of the bearing 11. The inner end of the slide is connected by a link 68 to the end of a rocker arm $g'$ that is mounted intermediate its ends upon a vertical stud 69 rising from the bracket 70 mounted on the foundation. The opposite end of this rocker arm (see Figs. 1 and 2) is connected by a pair of links 71 to a cross head 72 upon a piston rod 73 of a clutch operating engine G. This engine (see Figs. 1 and 3) is mounted upon a suitable bed-plate 74, and the stem 75 of its controlling valve is provided with an arm 76 connected by a rearwardly extending link 77 to an arm 78 upon a short horizontal cross shaft 79, journaled in bearings 80. At its inner end beneath the engineer's platform shaft 79 is provided with an arm 81 connected by a link 82 to an arm 83 of an operating hand lever 84. There are of course duplicate clutch mechanisms, one for each drum and by means of the operating levers 84 the engineer may control the operation of the clutch engines $g$ to couple and uncouple drums A, A' on the engine shaft so that either or both of the drums may be thrown into or out of operation.

The outer head $a^2$ of each drum (see Figs. 1 and 11) is provided with a flanged ring $h$ forming a seat for a brake band H. One end of the band is pivotally connected to the bracket 70 and the other end is connected to a crank arm 85 (see Fig. 3) on a short horizontal shaft $j$. This shaft is journaled at its ends in the bracket 70 and a bracket 86 on the foundation. The inner end of the brake operating shaft $j$ is provided with an upwardly extending crank arm 87 that is connected by a pair of parallel links 88 (see Figs. 1 and 3) to a cross head 89 on the piston rod 90 of the brake engine J. This engine is mounted in inclined position on a suitable frame 91 that rises from the bed-plate 74. The inner ends of the links 88 are slotted and a cross pin 92 projecting from the cross head 89 engages the slots. This bolt and slot or one-way connection permits the operation of the brake by hand gear independently of the engine, if the latter for any reason will not operate.

The brake engine is preferably provided with a differential valve motion comprising an arm 93 pivoted at its lower end to the engine frame 91 by a suitable stud or bolt 94 and connected at its inner end by a link 95 to the cross head of the engine. A floating lever 96 is connected by a pivot bolt 97 at a point intermediate its ends to the rocking arm 93 at a point adjacent the pivot of the latter. The lower end of the float lever is connected by a compound link comprising the members 98 and 99 to a rock arm 100 on the stem 101 of the valve of the brake engine. The upper end of the float valve is connected by a rod 102 to an arm 103 on the outer end of a short transverse horizontal shaft 104. This shaft is journaled in suitable brackets 105 on the bed-plate 50 and its inner end is provided with an arm 106 connected by a link 107 to the arm 108 of a hand lever 109 on the engineer's platform. The brake mechanism described is duplicated for the two drums and by means of the hand levers 109 the engineer may control the valves of the brake engines to apply or release the brake bands on the drums. It will be understood that the movement of the valve of each brake engine is controlled both by the hand lever and by the movement of the brake engine itself through the differential valve mechanism described, which is usually employed upon such engines.

The construction of the clutch mechanism, reverse gear and brake mechanism described may be varied without departure from the essentials of the invention, and these parts may be operated directly by hand. It is preferable however, in large engines, to employ the small auxiliary engines as described, for operating the clutch and brake mechanisms and the reverse gear.

Figure 1:
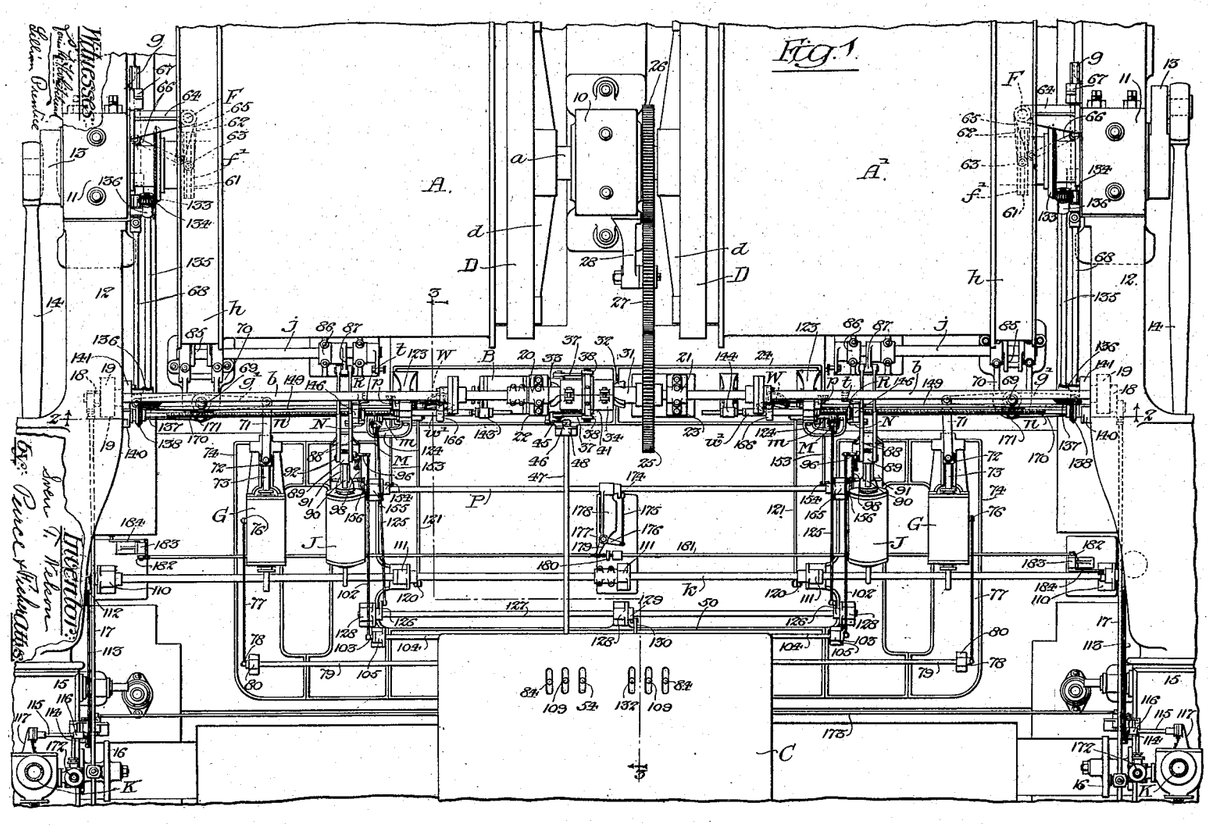
Figure 1 is a partial plan view of a double drum hoist with the improved controlling mechanisms applied thereto.

A throttle operating shaft $k$ extends transversely between the engine frames and is journaled at its ends in brackets 110 and at intermediate points in brackets 111. At each end (see Figs. 1 and 3) the throttle shaft is provided with a crank arm 112 connected by an upwardly extending rod 113 to a crank arm 114 on a short transverse shaft 115. This shaft is journaled at its ends in an upright bracket 116 on the engine cylinder and in a bracket 117 fixed to the casing of the throttle valve K and projecting laterally therefrom. A crank pin $115^a$ on the outer end of the shaft 115 engages a bolt block or cross head 118 on the outer end of the stem 119 of the throttle valve. Intermediate its ends (see Figs. 1 and 3) the throttle shaft $k$ is provided with two crank arms 120, each of which is connected by a rod 121 to the lower end of an arm 122. This arm is fixed to and depends from the end of a short shaft $m$ that is journaled (as most clearly shown in Figs. 3, 6 and 7) in an upright frame 123 on the base plate 24 and in a horizontal U-shaped bracket 124 that is fixed to the upright frame. There are two of these shifter rock shafts, as indicated in Figs. 1, 2 and $2^a$, and the outer end of each shaft is provided with an upwardly extending curved shifter arm M. These shifter arms are connected by links or rods 125 to crank arms 126 on the ends of a transverse shaft 127. This shaft (see Figs. 1 and 3) is journaled in suitable brackets 128 upon the base plate 50 and 74 and is centrally provided with a crank arm 129 connected by a link 130 to the arm 131 of a hand lever 132 on the engineer's platform. The throttle shaft $k$ is connected at its end, as described, to the throttle valve K of both engines and by shifting the hand lever 132 the engineer, through the medium of the connections described, may open and close both of the throttle valves.

Suitable mechanism is provided in connection with each of the drums, which is controlled by the movement thereof and arranged to automatically close the throttles. For this purpose, the hub of the outer head $a^2$ of each drum (see Figs. 1, 2 and 11) is provided with a beveled gear 133 meshing with a beveled pinion 134 on the forward end of a shaft 135. This shaft is journaled in suitable brackets 136 fixed to and projecting from the side of the adjacent engine frame 12. At its rear end the shaft is provided with a beveled gear 137 meshing with a beveled pinion 138 upon a sleeve 139 (see Fig. 2). This sleeve is journaled in a lug 140 on a bracket 141 fixed to the under side of the engine frame and is held against longitudinal movement by a collar 142 on its end. The outer end of a screw shaft $n$ extends within and is keyed to the sleeve 139 of the beveled pinion 138 to rotate therewith. This screw shaft, as hereinafter stated, is also longitudinally shiftable through the sleeve. There are two of the screw shafts (see Figs. 1, 2 and 2ª), one driven from each of the drums and these shafts extend inwardly through the upright frames 123, and the inner end of the left hand shaft is journaled and guided in a bracket 143 on the end of the reverse engine B. The inner end of the right hand screw shaft is journaled and is guided in an upright or standard 144 rising from the bed-plate 24.

Through the medium described, each drum drives a suitable actuator which operates to close the throttles of both engines as the car or cage connected to the drum reaches a predetermined point near the upper end of its travel. Each actuator is preferably in the form of a cam block or member N which (as most clearly shown in Figs. 6, 7 and 8) is secured to a lug 145 on a split nut block formed of separate members 146 and 147, which are bolted together and surround the actuating screw shaft $n$. The member 146 of the nut block is provided with a depending portion 148 which engages a rod 149. This rod extends longitudinally parallel with the screw and at its outer end (see Fig. 2) engages the bracket 141. The inner end of the rod 149 extends through the upright frame 123. In this way the nut block is held against revolution and a nut 150 carried thereby and engaging the threads of the screw shaft, is also held against revolution by suitable pins 151 (see Figs. 6 and 10).

In this manner the actuating cam member N will be slowly reciprocated back and forth upon the screw shaft $n$ in accordance with the direction in which the corresponding drum, that is geared to the screw shaft is moving.

At a certain point in the path of its travel the cam member is arranged to engage a roller 152 on the shifter arm M to move the same and thereby operate the throttle shaft $k$ through the connections previously described and shown in Fig. 3, to close the throttles of both engines. As stated, there are two of these shifter arms M connected to the throttle shaft $k$ and there are two actuating cam members N, one driven from each drum, and arranged to coöperate respectively one with each of the shifter arms. The gearing between the drums and actuating cam members is such, that when the car connected to one of the drums is approaching the surface, the corresponding cam member will travel toward the shifter arm M operated thereby and when the car is within two or three hundred feet of the surface, the cam member N will engage the shifter arm and close the throttle valves K so that the further upward travel of the car takes place under the momentum of the moving parts. The engineer may then readily apply the brakes to arrest the movement of the drum and car.

It is difficult and sometimes impossible to arrest the movement of the drum and car by means of the brake when the engine is running under a full head of steam, so that ordinarily the engineer must first close the throttles before operating the brake. With the present improved safety mechanism, the throttles are automatically closed when the car or cage is within two or three hundred feet of the surface, so that the car cannot run into the supporting structure at the top of the mine shaft under a full head of steam, and so that thereafter the brakes may be readily applied, either by hand or automatically to arrest the movement of the car. Preferably also, means are provided for automatically applying the brakes subsequent to the operation of the throttling mechanism and just before the car reaches the upper end of its travel. For this purpose, a pair of shifters are provided, each of which is preferably connected to operate the valves of the brake engines of both drums and a pair of actuators, one driven from each drum, are arranged to automatically operate these shifters at the proper point. The shifter is preferably in the form of an arm $p$ (see Fig. 6), which is mounted upon and depends from a short stud shaft $p'$ carried in the upper portion of the frame 123. There are two of these shifter arms and they are operated from actuator mechanisms driven by the respective drums. For this purpose (see Figs.

6, 7, 8 and 10) an actuator cam R is mounted upon each screw shaft n adjacent the nut block. This cam is free to slide longitudinally on the shaft over the screw threads, but as indicated in Fig. 10, is connected to rotate therewith by a key r engaging a suitable keyway in the screw shaft. At one side the cam is provided with an annular flange r' which engages a semi-circular lip 146' (see Figs. 7 and 10) on the member 146 of the nut block. By this arrangement the cam member R is slowly reciprocated back and forth in keeping with the movement of the corresponding drum and at the same time rotates with the screw shaft n. When one of the drums is lifting the car connected thereto, the motion of the corresponding screw thread is such that the cam members N and R are moved inwardly towards the center of the machine or in the direction of the arrows shown in Figs. 2 and 7. As the cam member R reaches the end of its traverse, it engages a roller S mounted on a stud s that is fixed to the corresponding shifter arm p, so that the latter is moved outwardly in the direction of the arrow indicated in Fig. 6. Roller S is yieldingly held in its position on the stud by a spring s' (see Fig. 7) so that the roller will yield slightly on the stud if the cam R does not at first properly engage the roller.

The lower ends of the shifter arms p are connected (see Figs. 1 and 3) by rods 153 to arms 154 upon a rock shaft P that is journaled at its ends in brackets 155 on the bedplates 74. The rock arms 154 (see Fig. 1) are mounted on the rock shaft P just inside the brackets 155. The ends of the shaft extend through the bracket and are provided (see Figs. 1 and 3, with rock arms 156. Each of these rock arms is provided with a pin 157 engaging a longitudinal slot 158 in the member 98 of the differential valve mechanism of the adjacent brake engine. As previously stated, the float lever 96 is connected to the arm 100 on the stem of the valve by a compound link formed of the members 98 and 99, which are pivotally connected together. In the ordinary position of the automatic stop shaft P and arm 156 thereon, the members 98 and 99 of this compound link are held in line so that motion is readily communicated from the float lever 96 to the valve stem, the link member 98 sliding back and forth upon the pin 157 on the rock arm 156. When the shifter arm p is operated, this shaft is rotated in the direction of the arrow shown in Fig. 3, and the link members 98 and 99 are buckled upwardly and, since the float lever is at this time stationary the valve of the brake engine is quickly opened to apply the brakes. In this buckled position of the link members, the valve of the brake engine cannot be shifted by hand so that it is impossible for the engineer to release the brakes from the platform. The automatic throttle mechanism is invariably operated whenever one of the cars approaches the surface, but the automatic stop mechanism is not applied unless the engineer is careless and fails to apply the brakes in the ordinary manner, but when the automatic brake mechanism is thrown into operation the brakes cannot be released by hand from the platform but the engineer must leave his position and disconnect the automatic brake mechanism as hereinafter described.

It will be noted that when the automatic stop mechanism is thrown into operation by either drum, the shaft P is rotated to operate both brake engines and apply the brakes of both drums.

As most clearly shown in Fig. 7, the shifter arm M is located in advance of the shifter arm p so that the throttles will be automatically closed, in the manner previously described, before the brakes are automatically applied. These parts are so set as stated, that the throttles are closed when the cage of either drum is within two or three hundred feet of the surface. The engineer should thereafter operate the valves of the proper brake engine by hand, but should he fail to do so, the actuator cam R will engage the roller S of one of the shift levers p and will automatically apply the brakes of both drums.

Figure 6:
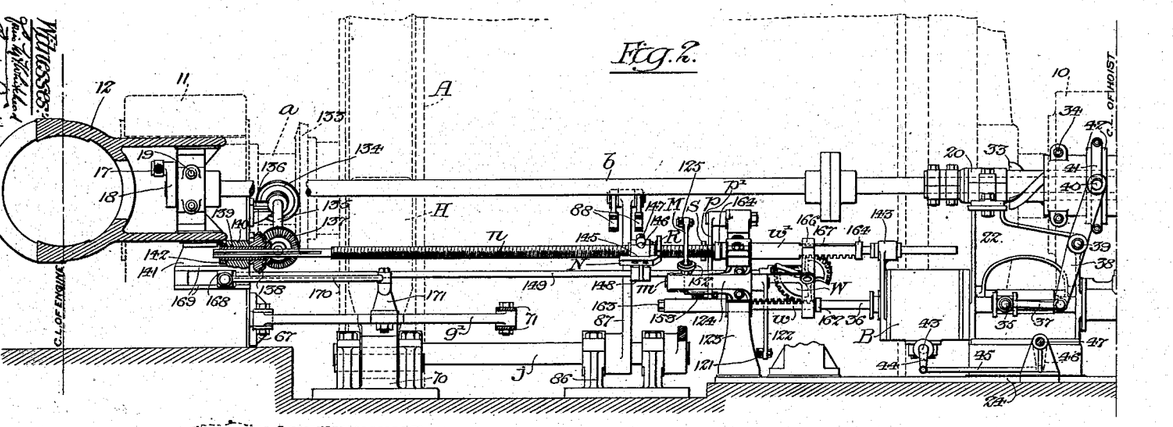
Fig. 6 is an enlarged detail view of a portion of the operating mechanism with parts shown in section on the line 6—6 of Fig. 2ª.
Figures 6, 7, 8, 9, 10:
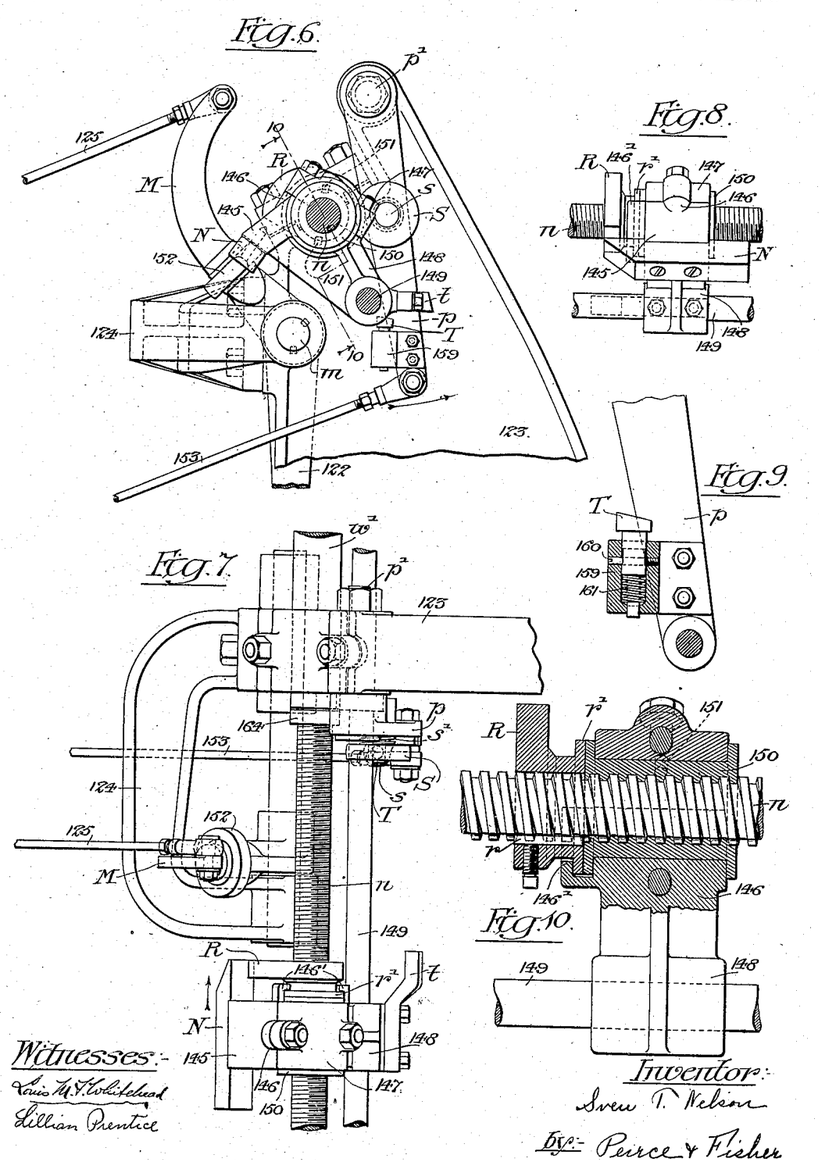
Fig. 7 is a plan view of the parts shown in Fig. 6.
Fig. 8 is a detail view in elevation of the actuating cam-members for the automatic throttling and brake mechanisms.
Fig. 9 is an enlarged detail view of certain parts shown in Fig. 6, with a portion thereof in section.
Fig. 10 is an enlarged detail section on the line 10—10 of Fig. 6.
Figure 6A:
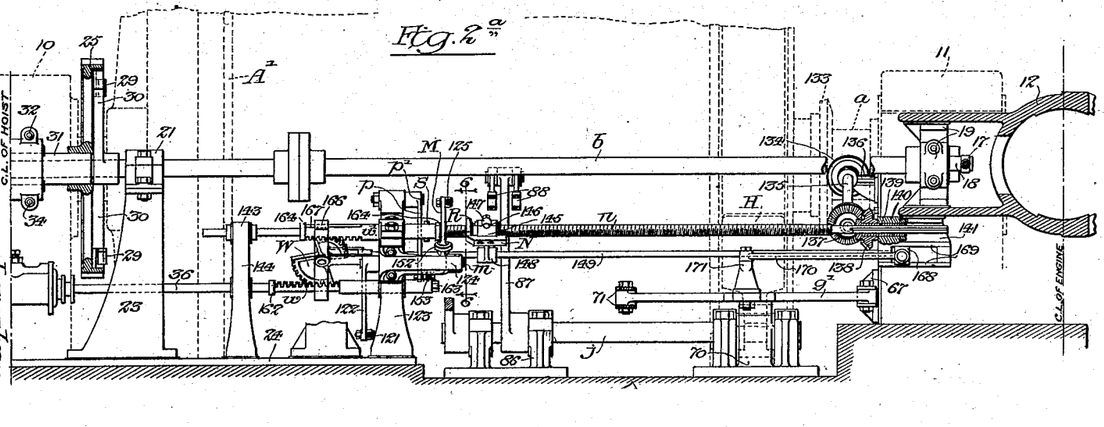

Each of the shifter arms p is provided at its lower end with a bracket or lug 159 having a vertical socket therein in which is arranged a reciprocating bolt or catch T (see Figs. 6 and 9.) A cross pin 160 extending through the lug 159 and through a slot in the catch bolt limits the movement of the latter. A spring 161 in the socket of the lug is coiled about a reduced portion of the catch bolt and normally holds it in uplifted position. The portion 146 of the traveling nut block on the screw shaft N carries on one side a bar t having an off-set inner end. As the nut block moves inwardly towards the end of its movement and in the direction of the arrow shown in Fig. 7, the off-set end of the bar t is moved into line with the catch bolt T on the shift lever p, and when the latter is moved outwardly by the engagement of the cam member R with the roller S thereon, the upper inclined or cam face of the catch bolt engages the end of the bar t and the bolt depressed as it is moved past beneath the bar t, so that it will spring up and engage the outer side of the bar to hold the arm p in its shifted position. The brakes are then applied as above described and the engineer cannot release them from the platform but must first reset the valve controlling mechanism of the brake engines. To do this he must first disengage the catch bolt T from the bar t. This may be done either by hand or from the platform by operating the reverse gear or clutch mechanism as hereinafter described. In the form shown, the gearing between the drums and the two sets of actuating cams N and R is such, that when both are coupled to the engine shaft, both drums sets are driven in the same direction, that is to say, one set is driven away from the shifter arms M and p operated thereby, while the other actuating cam members N and R are moved towards the shifter arms which they operate. As stated, the cables are wound on the drums in opposite directions so that when both are coupled to the engine shaft one of the cars is raised while the other is lowered and the drum connected to the car that is approaching the surface will move the corresponding actuating cam members towards the shifters M and p, and the latter will be automatically and successively operated, as described, to first throttle the engines and then automatically apply the brakes, so that any accidental overrunning of the cars is prevented and loss of life and property in this manner cannot occur.

When the automatic throttle mechanisms are thrown into operation by the movement of either drum, it is impossible for the engineer at first to open the throttles by means of hand lever 132 on the platform. The reverse mechanism however, is connected up to disengage or restore the automatic throttling mechanism so that by first reversing the engine, the throttle may be opened. In the form shown, the reverse engine is arranged to operate suitable shifters for disengaging or restoring the automatic devices controlled by both drums. For this purpose, the piston rod 36 of the reverse engine is extended at both ends (see Figs. 2 and 2ª) and is arranged to slide through openings in the frames 123 and the upright standard 144 which are arranged on opposite sides of the reverse engine. The shifters operated by the piston rod 36 are preferably in the form of double segment gears W. The lower toothed segments of these gears mesh with rack teeth formed on sleeves w that are mounted respectively upon the opposite ends of the piston rod 36. The upper tooth segments of the gears mesh with rack teeth on the sleeve w' that are carried on the inner ends respectively of the two screw shafts n. The rack sleeves w are rigidly held upon the ends of the piston rod against the collars 162 thereon by nuts 163 threaded upon the ends of the rod. The rack sleeves w' are held in place upon the screw shafts n between collars 164 thereon so as to shift longitudinally with the screw shafts, but permitting the independent rotation of the shafts within the sleeves. The shifters or segmental gears W are journaled upon cross studs 165 carried by rectangular frames 166 that are fixed to the inner ends of the rods 149. The sleeve racks w, w' (see Figs. 4 and 5) extend through the ends of the frame 166 and are provided with outer flattened faces 167 that engage the ends of the frame to prevent the rack sleeves from twisting. By the arrangement described, the screw shafts n are shifted longitudinally in opposite directions whenever the engine b is operated to reverse the hoisting engine. When the engine is running in the direction to raise the car connected to one of the drums, the reverse gear will be in such position that the screw shaft driven from that drum will be shifted inwardly and, after the actuator driven from the screw shaft has operated the throttling mechanism, the engineer may operate the reverse engine and the latter will shift the screw shaft and the actuating cam members N and R thereon outwardly to release the shifter arms M and p so that the throttles may be opened to operate the engine in reverse direction. At the same time the screw shaft driven from the other drum and the actuating cam members thereon are moved inwardly so that the automatic mechanisms will be properly operated when the car connected to that drum approaches the surface. The clutch mechanisms of each drum are also connected up to the corresponding shifters W to release or restore the automatic mechanism. It is sometimes desirable to release the automatic throttling and brake mechanisms without reversing the engine. If for example, both drums A, A' are coupled to the shaft and the engine is run in such direction, the car connected to drum A is lifted and that connected to drum A' is lowered. As soon as the car connected to the drum A approaches the surface, the automatic mechanisms will be operated. The engineer may wish to continue the operation of the engine in the same direction to lower the car connected to the drum A', but to do this he must first operate the clutch mechanism of the drum A to uncouple the same from the engine shaft and the clutch mechanisms will in turn operate to release or restore the automatic throttling mechanism so that the engineer can then open the throttles to continue the operation of the engine in the same direction. For this purpose, the rods 149 carrying the frames 166 and shifter gears W on their inner ends are longitudinally movable and at their outer ends (see Figs. 2 and 2ª) are connected to cross heads 168 arranged to slide in guides 169 in the brackets 141. Each cross head 168 is connected by a rod 170 to an upright or stud 171 on the rocker arm q' of the adjacent clutch mechanism. The stud 171 is eccentrically mounted (see Figs. 1 and 11) upon the rocker arm q so that as the clutch mechanism is shifted to couple and uncouple one of the drums on the engine shaft, rod 149, together with the shifter gears W carried thereby, is moved longitudinally back and forth. At such time the rack sleeve w on the piston rod of the reverse engine is stationary so that the shifter gears will be rotated to move the screw shaft n and actuating cam members carried thereby back and forth.

When the clutch mechanism is operated to connect one of the drums to the shaft, the screw shaft driven thereby will be shifted inwardly and when it is uncoupled the screw shaft will be shifted outwardly and if the cam members thereon have engaged the shifter arms of the throttling and automatic brake mechanisms, the latter will be released when the drum is uncoupled from the engine shaft.

In order that the actuating cams driven from one of the drums shall be in proper position to operate the throttling and automatic brake mechanisms when the car connected to that drum approaches the surface, the drum must be coupled to the shaft and the reverse gear must be in such position that the car connected to that drum is lifted. After the operation of the throttling mechanism by the movement of one of the drums, the engineer may release the same either by reversing the engine or by uncoupling that drum from the engine shaft. It is necessary however, that he should do one or the other before he can again open the throttles to operate the hoisting engine.

As stated, the throttling mechanism is set to automatically close the throttles of the engine when the car connected to either drum is within two or three hundred feet of the surface so that the further upward travel of the car is completed under the momentum of the moving parts. If desired, the by-pass valves 172 (see Fig. 1) may be provided adjacent each of the throttle valves K so that a small amount of steam may be admitted to the engine in case the momentum of the moving parts is not sufficient to carry the car to the end of its upward movement. These valves may be operated by a suitable shift lever on the engineer's platform through the medium of a rod 173 that is connected at its ends to the spindles of the by-pass valves 172. Such an arrangement of by-pass valves is fully set forth in my prior application No. 309,022, filed March 31, 1906 and need not be more fully described here.

If desired, the automatic brake shaft P may be arranged to be operated from the governor of the engine in case of excessive speed, and for this purpose may be provided intermediate its ends (see Fig. 1) with a crank arm 174 connected by a link 175 to an arm 176 on a vertical spindle 177 journaled in a bracket 178. An arm 179 on this spindle is arranged to be engaged by a nut 180 adjustably threaded on a longitudinally shiftable rod 181. This rod is connected at its ends to arms 182 on short spindles journaled in brackets 183. These spindles are provided with arms 184 which are connected in any suitable manner to the engine governor so that in case the engine should race the automatic brake shaft P would be shifted to operate the valves of the auxiliary engines J and apply the brakes.

It is obvious that numerous changes may be made in the details of structure and arrangement of parts without departure from the essentials of the invention.

Having described my invention, what I claim as new and desire to secure by Letters Patent is:—

1. In a hoisting engine, the combination with the engine shaft, hoisting drum and clutch for connecting said drum to said shaft, of mechanism for automatically throttling the flow of motor fluid to the engine at a predetermined point, an operating shift mechanism connected to said clutch and means connected to and actuated by said clutch operating mechanism for releasing or restoring said automatic throttling mechanism.

2. In a hoisting engine, the combination with the engine shaft, hoisting drum and clutch for coupling said drum to said shaft, of throttling mechanism for the engine, actuating means driven from the drum for operating said throttling mechanism at a predetermined point, an operating shifter connected to said clutch and means connected to and operated by said shifter for placing the actuating means of said throttling mechanism into and out of operative condition.

3. In a hoisting engine, the combination with the engine shaft, hoisting drum and clutch for coupling said drum to the shaft, of throttling mechanism for the engine, a shifter controlling said throttling mechanism, an actuator geared to and driven from said drum for operating said shifter at a predetermined point, an operating shifter connected to said clutch and means connected to and operated by said shifter for disengaging said actuator and shifter.

4. In a hoisting engine, the combination with the engine shaft, hoisting drum and clutch for coupling said drum to said shaft, of a throttle valve for the engine, a shift lever, connections between said lever and said throttle valve, an operating hand lever, connections between said hand lever and said shift lever an actuator driven from said drum for automatically operating said shift lever at a predetermined point and means connected to said clutch and shifted therewith for throwing said actuator and shift lever into and out of operative condition.

5. In a hoisting engine, the combination with the engine shaft, hoisting drum and a clutch for coupling said drum to said shaft, of a throttle valve for the engine, a rock shaft connected to said throttle valve, a shifter arm connected to said rock shaft, an operating hand lever connected to said shifter arm, an actuating cam member driven from said drum for automatically operating said shifter arm at a predetermined point and means connected to and shifted with said clutch for throwing said actuating cam and shifter arm into and out of operative relation.

6. In a hoisting engine, the combination with the engine shaft, hoisting drum and clutch for coupling said drum to said shaft, of a throttle valve for the engine, a shifter arm connected to said valve, an actuating cam member driven from the drum for automatically operating said arm at a predetermined point, a releasing shifter for disengaging said actuator and said shifter arm, operating mechanism connected to said clutch and means connected to and actuated by said clutch operating mechanism for operating said releasing shifter.

7. In a hoisting engine, the combination with the engine shaft, hoisting drum and clutch for coupling said drum to said shaft, of a throttle valve for the engine, a shifter arm connected to said throttle valve, a screw shaft geared to said drum and driven in opposite directions in accordance with the movement thereof and an actuating cam member reciprocated by said screw shaft and arranged to automatically actuate said shifter arm at a predetermined point.

8. In a hoisting engine, the combination with the engine shaft, hoisting drum and clutch for coupling said drum to said shaft, of a throttle valve for the engine, a shifter arm connected to said throttle valve, a screw shaft geared to said drum and driven in opposite directions in accordance with the movement thereof, an actuating cam member reciprocated by said screw shaft and arranged to automatically operate said shifter arm at a predetermined point, clutch operating mechanism and means connected to said clutch operating mechanism for disengaging said actuating cam member and said shifter arm.

9. In a hoisting engine, the combination with the engine shaft, hoisting drum and clutch for coupling said drum to said shaft, of a throttle valve for the engine, a shifter arm connected to said throttle valve, a screw shaft geared to said drum and driven in opposite directions in accordance with the movement thereof, an actuating cam member on said shaft, moved back and forth thereby and arranged to automatically operate said shifter arm at a predetermined point, a releasing or restoring shifter for moving said screw shaft longitudinally to disengage said actuating cam member from said shifter arm, clutch operating mechanism and means actuated thereby for operating said releasing shifter.

10. In a hoisting engine, the combination with an engine shaft, a pair of hoisting drums and clutches for coupling said drums to said shaft, of throttling mechanism for the engine, operating shifters for said throttling mechanism, actuators driven from said respective drums for engaging and operating said shifters at predetermined points, separate operating mechanisms connected to said clutches and means connected to and actuated by each clutch operating mechanism for disengaging or restoring the corresponding shifter and actuator.

11. In a hoisting engine, the combination with the engine shaft, a hoisting drum and a clutch for coupling said drum to said shaft, of throttling mechanism for the hoisting engine, actuating means driven from the drum for operating said throttling mechanism at a predetermined point, an auxiliary engine for operating said clutch and means operated by said clutch engine for releasing or restoring said throttle actuating means.

12. In a hoisting engine, the combination with the engine shaft and hoisting drum, of a throttle valve for the engine, an operating shifter arm connected to said throttle valve, an actuating cam member driven from said drum for engaging and operating said shifter arm at a predetermined point, reverse gear for the hoisting engine, an operating shifter connected to said reverse gear and means connected to and actuated by said reverse operating shifter for disengaging said actuator and shifter arm.

13. In a hoisting engine, the combination with the engine shaft and hoisting drum, of a throttle valve for the engine, a shifter controlling said throttle valve, a screw shaft driven by the engine, an actuating cam member reciprocated by said screw shaft and arranged to engage and operate said shifter at a predetermined point and engine reverse gear connected to shift said screw shaft longitudinally to disengage said actuating cam member from said shifter.

14. In a hoisting engine, the combination with the engine shaft and hoisting drum, of a throttle valve for the engine, an operating shifter controlling said throttle valve, an actuator driven by the engine arranged to effect the operation of said shifter at a predetermined point, reverse gear for the hoisting engine, an auxiliary engine for operating said reverse gear and means operated by said engine for throwing said actuator and shifter into and out of operative relation.

15. In a hoisting engine, the combination with the engine shaft, a hoisting drum and a clutch for coupling said drum to said shaft, of throttling mechanism for the engine, a shifter for operating said throttling mechanism, an actuator driven from said drum for operating said shifter at a predetermined point, clutch operating mechanism and means connected thereto for shifting said actuator to release said shifter.

16. In a hoisting engine, the combination with the engine shaft, a hoisting drum and a clutch for coupling said drum to said shaft, of throttling mechanism for the engine, a shifter for operating said throttling mechanism, an actuator driven from said drum for operating said shifter at a predetermined point, reverse gear for the hoisting engine and means connected to said reverse gear for shifting said actuator out of engagement with said shifter.

17. In a hoisting engine, the combination with the engine shaft, a pair of hoisting drums and clutches for coupling said drums to said shaft, of throttling mechanism for said engine, separate actuating mechanisms, one driven from each of said drums, for operating said throttling mechanism at predetermined points, reverse gear for the engine, shifters for throwing said actuating mechanisms alternately into and out of operative condition and reverse operating mechanism connected to operate said shifters.

18. In a hoisting engine, the combination with the engine shaft, a pair of drums mounted thereon and clutches for coupling said drum to said shaft, of throttling mechanism for the engine, a pair of shifters therefor, a pair of actuators, one driven from each of said drums, arranged to effect the operation of said shifters at predetermined points and reverse gear arranged to throw said actuators alternately into and out of operative relation with said shifters.

19. In a hoisting engine, the combination with the engine shaft, a pair of drums, and clutches for coupling said drums to said shaft, of a throttle valve for the engine, a pair of shifter arms controlling said valve, a pair of actuators for operating said shifters, a pair of screw shafts, one driven from each of said drums for reciprocating said actuators and engine reverse gear arranged to reciprocate said screw shafts and move said actuators alternately into and out of operative relation with their respective shifters.

20. In a hoisting engine, the combination with the engine shaft, a pair of drums on said shaft and clutches for coupling said drums to said shaft, of throttle valves for the engine, a pair of shifter arms connected to said throttle valves, a pair of screw shafts, one driven from each of said drums, actuating cam members on said screw shafts and reciprocated thereby to engage and operate said shifter arms at predetermined points, shifters for moving said screw shafts and actuating cam members longitudinally to move one cam member toward and the other away from the corresponding shifter arm and engine reverse gear connected to operate the shifters for said screw shafts.

21. In a hoisting engine, the combination with the engine shaft, a pair of drums on said shaft and clutches for coupling said drums to said shaft, of throttle valves for the engine, a pair of shifter arms connected to said throttle valves, a pair of screw shafts, one driven from each of said drums, actuating cam members on said screw shafts and reciprocated thereby to engage and operate said shifter arms at predetermined points, shifters for moving said screw shafts and actuating cam members longitudinally to move one cam member toward and the other away from the corresponding shifter arm, engine reverse gear and an auxiliary engine for operating said reverse gear, said reverse engine having means for operating the shifters for said screw shafts.

22. In a hoisting engine, the combination with the engine shaft, a hoisting drum, a clutch for coupling said drum to said shaft and engine reverse gear, of throttling mechanism for the engine, actuating devices driven from the drum for automatically operating said throttling mechanism at a predetermined point, a restoring shifter for said actuating means, clutch operating mechanism and means connected to and controlled by said clutch operating mechanism and said reverse gear for operating said shifter.

23. In a hoisting engine, the combination with the engine shaft, a hoisting drum, a clutch for connecting said drum to the engine shaft and engine reverse gear, of throttling mechanism for the engine, an operating shifter arm therefor, an actuating cam member driven from the drum for operating said shifter arm at a predetermined point, a releasing shifter for disengaging said cam member and shifter arm and means connected to said reverse gear and said clutch for operating said releasing shifter.

24. In a hoisting engine, the combination with the engine shaft, a drum, clutch mechanism for coupling said drum to said shaft and engine reverse gear, of throttling mechanism for the engine, a shifter arm for said throttling mechanism, a screw shaft driven from the drum, a cam member on said screw shaft and reciprocated thereby to operate said shifter arm at a predetermined point, a shifter for reciprocating said screw shaft and actuating cam member and means connected to said clutch mechanism and to said reverse gear for operating said shifter.

25. In a hoisting engine, the combination with the engine shaft, a drum, clutch mechanism for coupling said drum to said shaft and engine reverse gear, of throttling mechanism for the engine, a shifter arm for said throttling mechanism, a screw shaft driven from the drum, a cam member on said screw shaft and reciprocated thereby to operate said shifter arm at a predetermined point, a sleeve rack on said screw shaft, a shifter gear meshing with the teeth on said sleeve rack, a rack meshing with said gear and operatively connected with the reverse gear and an operative connection between said clutch mechanism and the stud whereon said gear is journaled.

26. In a hoisting engine, the combination with the engine shaft, a pair of drums, clutch mechanisms for coupling said drums to said shaft and engine reverse gear, of throttling mechanism for the engine, separate actuating mechanisms, one driven from each of said drums, for automatically operating said throttling mechanism at predetermined points, releasing shifters for said actuating mechanisms and operating connections between said shifters and the reverse gear and between said shifters and said clutch mechanisms.

27. In a hoisting engine, the combination with the engine shaft, a pair of drums, separate clutch mechanisms for coupling said drums to said shaft and engine reverse gear, of throttling mechanism for said engine, a pair of shifter arms for operating said throttling mechanism, a pair of actuating cam members, one driven from each of said drums, for operating said shifter arms at predetermined points, a pair of releasing shifters for disengaging said cam members from said shifter arms, operating connections between said releasing shifters and said engine reverse gear and operating connections between said releasing shifters and said clutch mechanisms.

28. In a hoisting engine, the combination with the engine shaft, a pair of hoisting drums, separate clutch mechanisms for coupling said drums to said shaft and reverse operating gear for the engine, of a throttle valve for the engine, a pair of operating shifter arms controlling said throttle valve, a pair of screw shafts, one driven from each of said drums, actuating cam members on said shafts reciprocated thereby to engage and operate said shifter arms at predetermined points, releasing shifters for moving said screw shafts and actuating cam members, an operating connection between said reverse gear and each of said shifters and operating connections between said clutch mechanisms and the corresponding shifters.

29. In a hoisting engine, the combination with the engine shaft, a pair of drums, separate clutches for connecting said drums to said shaft and engine reverse gear, of a throttle valve for the engine, a pair of shifter arms connected to said valve, a pair of screw shafts, one driven from each of said drums, actuating cam members mounted on and moved by said screw shafts to engage and operate said shifter arms at predetermined points, restoring shifters for said screw shafts and actuating cam members, an auxiliary engine for operating said reverse gear, connections between said auxiliary engine and said restoring shifters, auxiliary engines for operating said clutches and operating connections between each of said clutch engines and the corresponding restoring shifter.

30. In a hoisting engine, the combination with the engine shaft, a pair of drums, separate clutches for connecting said drums to said shaft and engine reverse gear, of throttle valves for the engine, a pair of shifter arms connected to said valves, a pair of screw shafts, one driven from each of said drums, actuating cam members mounted on and moved by said screw shafts to engage and operate said shifter arms at predetermined points, sleeve racks on said screw shafts, gears engaging said racks, an operating member for the reverse gear having racks engaging each of said gears, clutch operating mechanisms and connections between said clutch operating mechanisms and the studs whereon said gears are mounted.

31. In a hoisting engine, the combination with the engine shaft, a hoisting drum and clutch mechanism for coupling said drum to said shaft, of throttling mechanism for the engine, a brake for said drum and actuating mechanism driven from the drum for automatically and successively operating said throttling mechanism and said brake.

32. In a hoisting engine, the combination with the engine shaft, of a drum on said shaft and a clutch for coupling said drum to said shaft, of a throttle valve for the engine, a brake for said drum, separate shifter mechanisms for said throttle valve and said brake and actuating devices driven from said drum for automatically and successively operating said valve and brake shifter mechanisms at predetermined points.

33. In a hoisting engine, the combination with the engine shaft, a hoisting drum and a clutch for coupling said drum to said shaft, of a throttle valve for the engine, a brake for said drum, separate shifter mechanisms for said valve and said brake, hand levers for operating said shifter mechanisms, and actuating devices driven from said drum for automatically and successively operating said valve and said brake shifter mechanisms at predetermined points.

34. In a hoisting engine, the combination with the engine shaft, a hoisting drum and clutch mechanism for coupling said drum to said shaft, of a throttle valve for the engine, a brake for said drum, shifter mechanisms for said valve and brake, actuating devices driven by the drum for automatically and successively operating said valve and brake shifter mechanisms and means connected to and controlled by said clutch mechanism for releasing or restoring said actuating devices.

35. In a hoisting engine, the combination with the engine shaft, a hoisting drum and clutch mechanism for coupling said drum to said shaft, of a throttle valve for the engine, a brake for said drum, shifter mechanisms for said valve and brake, actuating devices driven by the drum for automatically and successively operating said valve and brake mechanisms, engine reverse gear and means connected to and controlled by said engine reverse gear for releasing and restoring said actuating devices.

36. In a hoisting engine, the combination with the engine shaft, a hoisting drum and clutch mechanism for coupling said drum to said shaft, of a throttle valve for the engine, a brake for said drum, shifter mechanisms for said valve and brake, actuating devices driven by the drum for automatically and successively operating said valve and brake mechanisms, engine reverse gear and means connected to and controlled by said clutch mechanism and said engine reverse gear for releasing and restoring said actuating devices.

37. In a hoisting engine, the combination with the engine shaft, a hoisting drum and clutch mechanism for coupling said drum to said shaft, of throttling mechanism for the engine, a brake for said drum, a pair of shifter arms controlling said throttling mechanism and said brake and actuating cam members driven from said drum for automatically and successively operating said valve and brake shifter arms.

38. In a hoisting engine, the combination with the engine shaft, a hoisting drum and clutch mechanism for coupling said drum to said shaft, of throttling mechanism for the engine, a brake for said drum, a pair of shifter arms controlling said throttling mechanism and said brake, actuating cam members driven from said drum for automatically and successively operating said valve and brake shifter arms, a restoring shifter for disengaging said actuating cam members and said shifter arms, engine reverse gear and operating connections extending from said reverse gear and said clutch mechanism to said restoring shifter.

39. In a hoisting engine, the combination with the engine shaft, a hoisting drum and clutch mechanism for coupling said drum to said shaft, of throttling mechanism for the engine, a brake for said drum, a pair of shifter arms controlling said throttling mechanism and said brake, a screw shaft driven from said drum and actuating cam members on said screw shaft and operated thereby arranged to automatically and successively actuate said valve and brake shifter arms.

40. In a hoisting engine, the combination with the engine shaft, a hoisting drum and clutch mechanism for coupling said drum to said shaft, of throttling mechanism for the engine, a brake for said drum, a pair of shifter arms controlling said throttling mechanism and said brake, a screw shaft driven from said drum, actuating cam members on said screw shaft and operated thereby arranged to automatically and successively actuate said valve and brake shifter arms at predetermined points, a restoring shifter for longitudinally shifting said screw shaft and actuating cam members, engine reverse gear operatively connected to said restoring shifter and operating connections between said clutch mechanism and said restoring shifter.

41. In a hoisting engine, the combination with the engine shaft, a hoisting drum, a clutch for coupling said drum to said shaft, of throttling mechanism for the engine, a brake for said drum, an auxiliary engine for operating said brake, a pair of shifter arms controlling said throttling mechanism and said brake engine, actuating cam members driven from the drum for automatically and successively operating said throttling and brake shifter arms, a restoring shifter for said actuating cam members, engine reverse gear, an auxiliary engine for said reverse gear, an operating connection between said reverse engine and said restoring shifter, an auxiliary engine for operating said clutch mechanism and an operating connection between said clutch engine and said restoring shifter.

42. In a hoisting engine, the combination with the engine shaft, a pair of hoisting drums and separate clutch mechanisms for coupling said drums to said shaft, of throttling mechanism for the engine, brakes for said drums and actuating devices driven by each of said drums for automatically and successively operating said throttling mechanism and said brakes.

43. In a hoisting engine, the combination with the engine shaft, of a pair of hoisting drums and separate clutch mechanisms for coupling said drums to the engine shafts, of throttling mechanism for the engine, a pair of shifters therefor, a brake for each of said drums, shifters for said brakes and actuating cam devices, one driven from each of said drums, for automatically and successively operating the shifters of the throttling mechanism and the corresponding brakes.

44. In a hoisting engine, the combination with the engine shaft, of a pair of hoisting drums and separate clutch mechanisms for coupling said drums to the engine shafts, of throttling mechanism for the engine, a pair of shifters therefor, a brake for each of said drums, shifters for said brakes, actuating cam devices, one driven from each of said drums for automatically and successively operating the shifters of the throttling mechanism and the brakes, restoring shifters for said actuating cam devices, and engine reverse gear operatively connected to said restoring shifters.

45. In a hoisting engine, the combination with the engine shaft, of a pair of hoisting drums and separate clutch mechanisms for coupling said drums to the engine shafts, of throttling mechanism for the engine, a pair of shifters therefor, a brake for each of said drums, shifters for said brakes, actuating cam devices, one driven from each of said drums for automatically and successively operating the shifters for the throttling mechanism and the brakes, restoring shifters for said actuating cam devices, reverse gear for the engine operatively connected to said restoring shifters and connections between each of said clutch mechanisms and the corresponding restoring shifter.

46. In a hoisting engine, the combination with the engine shaft, a pair of hoisting drums on said shaft, and separate clutches for coupling said drums to said shaft, of throttle valves for the engine, separate brakes for said drums, auxiliary engines for operating said brakes, shifter arms controlling the operation of said brake engines, a pair of shifter arms controlling the operation of the throttle valves, actuating cam devices, one set driven from each of said drums, for automatically and successively operating the shifter arms of the throttle mechanism and of the brakes, restoring shifters for said actuating cam devices, a reverse gear for the hoisting engine, an auxiliary engine for operating said reverse gear, operating connections between said auxiliary engine and said restoring shifters, auxiliary engines for operating said clutches and operating connections between each of said clutch engines and the corresponding restoring shifter.

47. In a hoisting engine, the combination with the engine shaft, hoisting drum and clutch for connecting said shaft and drum, of a screw shaft geared to said drum and driven in opposite directions thereby, mechanism operated by said screw shaft at a predetermined point for automatically cutting off or throttling the flow of motor fluid to said engine, and means controlled by the operation of said clutch mechanism for throwing said automatic throttling mechanism into and out of operative condition.

48. In a hoisting engine, the combination with the engine shaft, hoisting drum and clutch mechanism for connecting said shaft and drum, of mechanism for cutting off or throttling the flow of motor fluid to said engine, a shifter arm controlling the operation of said throttling mechanism, a screw shaft geared to said drum and driven in opposite directions thereby, an actuator operated by said screw shaft and arranged to effect the operation of said shifter arm at a predetermined point, and means controlled by the operation of said clutch mechanism for throwing said actuator and said shifter into and out of operative condition.

49. In a hoisting engine, the combination with the engine shaft, a pair of hoisting drums and separate clutch mechanisms for connecting said drums to said shaft, separate screw shafts geared respectively to said drums and driven in opposite directions thereby, means operated by each of said screw shafts for automatically throttling or cutting off the flow of motor fluid to the engine at a predetermined point, and means controlled by the operation of said clutch mechanisms for releasing or restoring the corresponding automatic throttling mechanism.

50. In a hoisting engine, the combination with the engine shaft, a pair of hoisting drums and separate clutches for connecting said drums to said shaft, of a throttle valve for said engine, a pair of shifters, each arranged to control said throttle valve, a pair of screw shafts, one geared to and driven in opposite directions by each of said drums, actuators reciprocated by said screw shafts and arranged to effect the operation of said controlling shifters at predetermined points and means for controlling the operation of each of said clutches arranged to throw the corresponding actuator and shifter into and out of operative relation.

51. In a hoisting engine, the combination with the engine shaft, a pair of hoisting drums and separate clutches for connecting said drums to said shaft, of a throttle valve for said engine, a pair of shifters for controlling the operation of said throttle valve, screw shafts geared respectively to said drums and driven in opposite directions thereby, separate actuators reciprocated by said screw shafts and arranged to effect the operation of said shifters at predetermined points, releasing shifters for moving said screw shafts longitudinally to throw said actuators and said valve-controlling shifters into and out of operative relation, and means controlling the operation of each of said clutches arranged to effect the operation of the corresponding releasing shifter.

52. In a hoisting engine, the combination with the engine shaft, a pair of drums and clutches for connecting said drums and said shaft, of a throttle valve for the engine, a pair of screw shafts, one geared to and driven in opposite directions by each of said drums and separate actuating devices driven respectively by said screw shafts and arranged to effect the operation of the throttle valve at predetermined points.

53. In a hoisting engine, the combination with the engine shaft, a pair of hoisting drums and separate clutches for coupling said drums to said shaft, of means for cutting off or throttling the flow of motor fluid to the engine, a pair of shifters controlling the operation of said throttling means, a pair of screw shafts, one geared to each of said drums and driven thereby in opposite directions, and a pair of actuators reciprocated respectively by said screw shafts and arranged to effect the automatic operation of said controlling shifter at predetermined points.

54. In a hoisting engine, the combination with the engine shaft, a pair of hoisting drums and separate clutch mechanisms for connecting and disconnecting said drums and said shaft, of means for cutting off or throttling the flow of motor fluid to the engine, a pair of shifters for controlling the operation of said throttling mechanism, a pair of screw shafts, one geared to each of said drums and driven thereby in opposite directions, and a pair of actuators operated by said screw shafts and arranged to effect the operation of said shifters at predetermined points and means controlled by the operation of each of said clutch mechanisms for throwing the corresponding actuator and shifter into and out of operative relation.

55. In a hoisting engine, the combination with the engine shaft, a pair of hoisting drums, and separate clutch mechanisms for connecting and disconnecting said drums and said shaft, of means for cutting off or throttling the flow of motor fluid to the engine, separate screw shafts, one connected to each of said drums and driven thereby in opposite directions, separate actuating means operated by said screw shafts and arranged to effect the operation of said throttling means at predetermined points, engine reverse gear, and means controlled by the operation of said engine reverse gear for shifting said screw shafts longitudinally to alternately throw said actuating mechanisms into and out of operative condition.

56. In a hoisting engine, the combination with the engine shaft, a pair of hoisting drums, and separate clutch mechanisms for connecting and disconnecting said drums and said shaft, of mechanism for throttling or cutting off the flow of motor fluid to the engine, separate screw shafts, one geared to each of said drums and driven thereby in opposite directions, separate actuating mechanisms operated by each of said screw shafts and arranged to effect the operation of said throttling mechanism at predetermined points, and means controlled by the operation of each of said clutch mechanisms for shifting the corresponding screw shaft longitudinally to throw the actuating mechanism operated thereby into and out of operative condition.

57. In a hoisting engine, the combination with the engine shaft, a pair of hoisting drums and separate clutch mechanisms for connecting and disconnecting said drums and said shaft, of mechanism for cutting off or throttling the flow of motor fluid to the engine, a pair of screw shafts, one geared to each of said drums and driven thereby in opposite directions, a pair of actuators reciprocated respectively by said screw shafts and arranged to effect the operation of said throttling mechanism at predetermined points, engine reverse gear, means controlled by the operation of said engine reverse gear by shifting said screw shafts longitudinally to alternately throw said actuating mechanisms into and out of operative condition and means controlled by the operation of each of said clutch mechanisms for shifting the corresponding screw shafts longitudinally to throw the actuating mechanism thereof into and out of operative condition.

58. In a hoisting engine, the combination with the engine shaft and hoisting drum driven thereby, of brake mechanism for said drum, means driven by the engine for effecting the automatic application of said brake mechanism at a predetermined point, engine reverse gear and means controlled thereby for releasing or restoring said automatic brake mechanism.

59. In a hoisting engine, the combination with the engine shaft and hoisting drum driven thereby, of brake mechanism for said drum, a shifter controlling the application of said brake mechanism, an actuator driven by the engine and arranged to effect the operation of said shifter at a predetermined point, engine reverse gear, and means controlled thereby for throwing said actuator and shifter into and out of operative relation.

60. In a hoisting engine, the combination with the engine shaft and hoisting drum driven thereby, of a clutch mechanism for connecting and disconnecting said drum and shaft, brake mechanism for said drum, means driven from said drum and arranged to effect the automatic application of said brake mechanism at a predetermined point, and means controlled by the operation of said clutch mechanism for releasing or restoring said automatic brake mechanism.

61. In a hoisting engine, the combination with the engine shaft, hoisting drum, clutch mechanism for connecting and disconnecting said shaft and drum, and brake mechanism for said drum, of a shifter controlling the operation of said brake mechanism, an actuator driven from said drum arranged to effect the operation of said shifter at a predetermined point, and means controlled by the operation of said clutch mechanism for throwing said actuator and said shifter into and out of operative relation.

62. In a hoisting engine, the combination with the engine shaft, a pair of hoisting drums, separate clutch mechanisms for connecting and disconnecting said drums and said shaft, and separate brake mechanisms for said drums, of means driven from said drums for effecting the automatic application of said brake mechanisms at predetermined points, engine reverse gear, and means controlled by said engine reverse gear and by each of said clutch mechanisms for releasing or restoring said automatic brake mechanism.

63. In a hoisting engine, the combination with the engine shaft, a pair of hoisting drums, separate clutch mechanisms for connecting and disconnecting said drums and said shaft, of separate brake mechanisms for said drums, actuating mechanisms, one driven from each of said drums, arranged to effect the automatic application of said brake mechanisms at predetermined points, engine reverse gear, means controlled by the operation of said engine reverse gear for alternately throwing said actuating mechanisms into and out of operative condition, and means controlled by the operation of each said clutch mechanisms for throwing the corresponding actuating mechanism into and out of operative condition.

64. In a hoisting engine, the combination with the engine shaft and hoisting drum driven thereby, of means for cutting off or throttling the flow of motor fluid to the engine, a shifter controlling the operation of said throttling means, a screw shaft, a drive gear for said screw shaft driven by the engine and through which gear said screw shaft is longitudinally movable, an actuator reciprocated by said screw shaft and arranged to effect the operation of said shifter at a predetermined point, engine reverse gear, and means controlled by the operation of the engine reverse gear for shifting said shaft longitudinally to throw said actuator into and out of operative relation with said shifter.

65. In a hoisting engine, the combination with the engine shaft, a pair of hoisting drums, and separate clutch mechanisms for connecting and disconnecting said shaft and said drums, of means for throttling or cutting off the flow of motor fluid to the engine, a pair of shifters controlling the operation of said throttling means, a pair of screw shafts, drive gears for said screw shafts, one driven from each of said drums, said screw shafts being longitudinally shiftable through said gears, actuators driven respectively by said screw shafts and arranged to operate said shifters at predetermined points, and means controlled by the operation of each of said clutch mechanisms for shifting the corresponding screw shaft longitudinally to throw the corresponding actuator and shifter into and out of operative relation.

66. In a hoisting engine, the combination with the engine shaft, a pair of hoisting drums, and separate clutch mechanisms for connecting and disconnecting said shaft and said drums, of means for throttling or cutting off the flow of motor fluid to the engine, a pair of shifters controlling the operation of said throttling means, a pair of screw shafts, drive gears for said screw shafts, one driven from each of said drums, said screw shafts being longitudinally shiftable through said gears, actuators driven respectively by said screw shafts and arranged to operate said shifters at predetermined points, engine reverse gear, means controlled by the operation of said engine reverse gear for shifting said screw shafts longitudinally to alternately throw said actuators and said shifters into and out of operative relation, and means controlled by each of said clutch mechanisms for shifting the corresponding screw shafts longitudinally to throw the corresponding actuator and shifter into and out of operative relation.

SVEN T. NELSON.

Witnesses:
KATHARINE GERLACH,
LILLIAN PRENTICE.